(12) United States Patent
Kikuta

(10) Patent No.: US 9,132,852 B2
(45) Date of Patent: Sep. 15, 2015

(54) SUPPORT BRACKET, MANUFACTURING METHOD THEREOF, AND ELECTRIC POWER-STEERING APPARATUS

(75) Inventor: Tomoyuki Kikuta, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/007,970

(22) PCT Filed: Jul. 23, 2012

(86) PCT No.: PCT/JP2012/068579
§ 371 (c)(1),
(2), (4) Date: Mar. 4, 2014

(87) PCT Pub. No.: WO2013/027520
PCT Pub. Date: Feb. 28, 2013

(65) Prior Publication Data
US 2014/0158454 A1   Jun. 12, 2014

(30) Foreign Application Priority Data

Aug. 23, 2011 (JP) ................................. 2011-181261
May 21, 2012 (JP) ................................. 2012-115711

(51) Int. Cl.
| | |
|---|---|
| *B62D 5/04* | (2006.01) |
| *B21D 53/88* | (2006.01) |
| *B62D 1/16* | (2006.01) |
| *B21D 22/02* | (2006.01) |
| *B62D 1/18* | (2006.01) |
| *B21D 35/00* | (2006.01) |

(52) U.S. Cl.
CPC .............. *B62D 5/0403* (2013.01); *B21D 22/02* (2013.01); *B21D 35/001* (2013.01); *B21D 53/88* (2013.01); *B62D 1/16* (2013.01); *B62D 1/18* (2013.01); *B62D 5/04* (2013.01)

(58) Field of Classification Search
CPC .......... B21D 5/00; B21D 22/00; B21D 22/02; B23P 11/00
USPC .......... 72/379.2; 180/443, 444; 248/674, 675; 29/505, 521
See application file for complete search history.

(56) References Cited

U.S. PATENT DOCUMENTS

| | | | |
|---|---|---|---|
| 2009/0272599 A1* | 11/2009 | Sekine et al. | 180/443 |
| 2010/0218637 A1* | 9/2010 | Barroso | 74/493 |

FOREIGN PATENT DOCUMENTS

| | | | |
|---|---|---|---|
| JP | 2001-055151 A | | 2/2001 |
| JP | 2003-026004 A | | 1/2003 |
| JP | 2003026004 A | * | 1/2003 |
| JP | 2005-219641 A | | 8/2005 |
| JP | 2011-131682 A | | 7/2011 |

* cited by examiner

*Primary Examiner* — Joseph Rocca
*Assistant Examiner* — Felicia L Brittman
(74) *Attorney, Agent, or Firm* — Miles & Stockbridge P.C.

(57) ABSTRACT

A support bracket structure is realized, in which the support bracket is made using a metal plate and sufficient strength and rigidity thereof can be maintained, and the production costs thereof can be kept sufficiently low by improving the yield of material. A support bracket 14a for supporting the front end section of a steering column 6a by way of a housing 9a of an electric power-steering apparatus is manufactured by using a press to punch out and bend a metal plate. By devising the dimensions and bending direction of each part, the yield of material is improved, while at the same time the height dimensions of the first side plate section 19 and the second side plate section 20 required for maintaining the support rigidity under a heavy load is maintained.

9 Claims, 14 Drawing Sheets

SUPPORT BRACKET, MANUFACTURING METHOD THEREOF, AND ELECTRIC POWER-STEERING APPARATUS

TECHNICAL FIELD

The present invention relates to an electric-power steering apparatus, and particularly to a support bracket by which a vehicle supports a steering column of this electric power-steering apparatus.

BACKGROUND ART

The use of electric power-steering apparatuses is widely spread as a steering apparatus for applying a steering angle to the steered wheels of an automobile, and that uses an electric motor as a drive source to reduce the steering force. FIG. 14 illustrates an example of a conventional electric power-steering apparatus that is disclosed in JP 2011-131682 (A). In this structure, the rotation of a steering wheel 1 is transmitted to an input shaft 3 of a steering gear unit 2, and as the input shaft 3 rotates, a pair of left and right tie rods 4 are pushed or pulled, which applies a steering angle to steered wheels. The steering wheel 1 is supported by and fastened to the rear end section of a steering shaft 5, and this steering shaft 5 is inserted in the axial direction through a cylindrical steering column 6, and supported by this steering column 6 so as to be able to freely rotate. Moreover, the front end section of the steering shaft 5 is connected to the rear end section of an intermediate shaft 8 by way of a universal joint 7a, and the front end of this intermediate shaft 8 is connected to the input shaft 3 by way of another universal joint 7b. The forward-backward direction and the width direction in this specification mean the forward-backward direction and the width direction of the vehicle when the steering apparatus is assembled in the vehicle, and left and right in the width direction means the left and right with respect to the direction of travel when the vehicle is traveling in the forward direction.

The front end section of the steering column 6 is connected to a housing 9 of the electric power-steering apparatus. Component parts of the electric power-steering apparatus such as a torque detector, a worm reduction gear and the like are housed inside this housing 9, and an electric motor 10, which is an auxiliary power source of the electric power-steering apparatus, is supported by the outside surface of this housing 9. Moreover, in order to construct a tilt mechanism for adjusting the height position of the steering wheel 1, the housing 9 is supported by the vehicle body 11 so as to be able to pivotally displace around a pivot shaft 12 that is arranged in the width direction of the vehicle, and the a portion on the rear side of the intermediate section of the steering column 6 is supported by a rear support bracket 13 that is supported by the vehicle body 11 such that the up-down position can be adjusted. In regards to the detailed structure of this tilt mechanism, various kinds of structures are known, and because the adjustment mechanism for adjusting the up-down position with respect to the rear support bracket 13 is not related to the main feature of the present invention, detailed drawings and explanations are omitted.

As described above, in order to construct an electric power-steering apparatus that comprises a tilt mechanism, the housing 9 that is connected to the front end section of the steering column 6 must be supported by the vehicle body 11 so as to be able to pivotally displace around a pivot shaft 12 that is arranged in the width direction. Therefore, it is necessary that a support bracket 14 be fastened to the vehicle body 11, and that this support bracket 14 and housing 9 be connected by the pivot shaft 12. The support bracket 14 supports the front end section of the steering column 6 by way of the housing 9 in or to which the component parts of the electric power-steering apparatus are housed or mounted, so it is necessary that the strength and rigidity of the support bracket 14 be sufficiently large. On the other hand, in order to suppress manufacturing costs of an electric power-steering apparatus that comprises a tilt mechanism, preferably this support bracket 14 is made by using a press to punch and bend a metal plate such as steel plate having the required strength and rigidity, such as disclosed in JP 2005-219641 (A). However, when trying to make the support bracket 14 using a metal plate, while at the same time maintain the required strength and rigidity, the cutting stock is insufficient, and it is easy for the metal plate material to be wasted. In order to keep the manufacturing costs of the support bracket 14 low, it is necessary to effectively use the metal plate and to improve the material yield. However, a support bracket made using a metal plate having structure that can meet these needs has not been achieved yet.

RELATED LITERATURE

Patent Literature

[Patent Literature 1] JP 2011-131682 (A)
[Patent Literature 2] JP 2005-219641 (A)

SUMMARY OF THE INVENTION

Problem to be Solved by the Invention

Taking the above situation into consideration, the object of the present invention is to provide a support bracket that is made using a metal plate and is capable of maintaining sufficient strength and rigidity, as well as can be manufactured with good material yield and sufficiently low cost.

Means for Solving the Problems

The present invention relates to a support bracket for supporting a steering column on a vehicle body together with a housing in which and on which components of an electric power-steering apparatus are housed or mounted. The support bracket of the present invention is made by punching and bending a metal plate into a single piece having a left and right asymmetrical shape.

The support bracket of the present invention is characterized by comprising: a base plate section that is provided in the width direction on the rear end section of the support bracket; a pair of left and right rear installation plate sections that are provided on both end sections in the width direction of the base plate section; a first extended section and a second extended section that extend forward from the edge on the front end of these rear installation plate sections; a first side plate section that is bent upward from the edge on the inside in the width direction of the first extended section; a second side plate section that is bent upward from the edge on the outside in the width direction of the second extended section; a first front installation plate section that is provided in a state of being bent outward in the width direction from the edge on the top end of the first side plate section; and a second front installation plate section that is provided in a state of being bent outward in the width direction from the edge on the top end of the second side plate section.

Preferably, the support bracket of the present invention further comprises: a first reinforcement plate section that extends downward toward the front from the edge on the front end of the first front installation plate section, and has an edge on the rear end that is continuous to the edge on the front end of the first front installation section by way of a bent section, and an edge on the end in the width direction that is continuous to the edge on the top end of the first side plate section by way of a bend section; and a second reinforcement plate section that extends downward toward the rear from the edge on the rear end of the second front installation plate section, and has an edge on the front end that is continuous to the edge on the rear end of the second front installation plate section by way of a bent section, and an edge on the end in the width direction that is continuous to the edge on the top end of the second side plate section by way of a bent section.

As the structure for supporting the steering column, in the first example, circular holes for supporting a pivot shaft for supporting the steering column are formed in the front end sections of the first side plate section and second side plate section.

Preferably, the front end section of the second side plate section is offset inward in the width direction, and the space between the front end sections of the first side plate section and second side plate section is more narrow than the space between the middle sections and rear sections of the first side plate section and the second side plate section.

In this case, preferably, the front end section of the second side plate section is continuous with the middle section in the forward-backward direction of the second side plate section by way of an inclined plate section, and a reinforcement rib that protrudes inward in the bending direction is provided in the middle section in the up-down direction of the bent section where the middle section of the second side plate section and the inclined plate section are continuous.

The support bracket of the present invention can be manufactured by a manufacturing method that comprises a first process of forming an intermediate material that has an overall flat shape by stamping out this intermediate material from a raw material that has a flat shape; and a second process of bending this intermediate material.

More specifically, in the first process, the intermediate material that has an overall flat shape is formed that comprises: a raw base plate section that exists in a portion that corresponds to the base plate section; a first raw extended section and a second raw extended section that extend forward from the edge on the front end of the end sections on both the left and right sides of the raw base plate section; a first raw side plate section that extends from the edge on the inside in the width direction of the first raw extended section to the center side in the width direction; and a second raw side plate section that extends from the edge on the outside in the width direction of the second raw extended section to the outside in the width direction.

Next, in the second process, the base end section of the first raw side plate section is bent with respect to the first raw extended section, and the base end section of the second raw side plate section is bent with respect to the second raw extended section in the same direction in the thickness direction of the intermediate material at right angles to form the first side plate section and second side plate section, and the end sections in the width direction of the first side plate section and second side plate section are bent to the outside in the width direction of the intermediate material in opposite directions from each other to form the first front installation plate section and the second installation plate section.

In this case, preferably, with reference to the width direction of the intermediate material, the distance from the bent section between the base end section of the first raw side plate section and the first raw extended section to the edge on the inside in the width direction of the first raw side plate section is greater than the distance from the bent section between the base end section of the second raw side plate section and the second raw extended section to the edge on the outside in the width direction of the second raw side plate section.

The electric power-steering apparatus of the present invention comprises: a steering column; a housing that is connected to the front end section of the steering column and in which or on which components of the electric power-steering apparatus are mounted; and a support bracket that supports and fastens the front end section of the steering column to the vehicle body together with the housing. Particularly, in the electric power-steering apparatus of the present invention, the support bracket of the present invention is used as the support bracket.

In this case, preferably the front end section of the steering column is supported by a pivot shaft that spans between the front end sections of the first side plate section and second side plate section so as to be able to pivotally displace with respect to the vehicle body.

Moreover, in the support bracket, the front end section of the second side plate section is offset inward in the width direction, and the space between the front end sections of the first side plate section and the second side plate section is more narrow than the space between the middle sections and the rear sections of the first side plate section and second side plate section, and the component parts are arranged in a space between the middle sections and the rear sections of the first side plate section and the second side plate section that has a larger space in the width direction.

Furthermore, preferably the component parts are located at a position offset more toward the side of the second side plate section than the center position in the width direction of the space between the first side plate section and the second side plate section.

Effect of the Invention

With the present invention, it is possible to manufacture at low cost a support bracket having necessary strength and rigidity, as well as good blanking characteristics. More specifically, the bending directions of the first side plate section and the second side plate section with respect to the first extended section and second extended section of the support bracket are devised so as to be in the same direction in the intermediate material stage, so it is possible in the intermediate material stage to use the material existing between the first extended section and the second extended section efficiently, while maintaining the width dimensions in the up-down direction of the first side plate section and the second side plate section. Therefore, it is possible to maintain yield of the metal plate, and keep the costs of manufacturing the support bracket low.

Moreover, the height dimensions in the up-down direction of the first side plate section and the second side plate section are maintained, so the strength and rigidity of the support bracket of the present invention under loading in this direction is high. Therefore, when a pivot shaft spans between the front end sections of the first side plate section and the second side plate section, it is possible for the support bracket of the present invention to sufficiently support the weight of the components of the steering column and electric power-steering apparatus that is applied by way of the pivot shaft.

MODES FOR CARRYING OUT THE INVENTION

Figure 1:
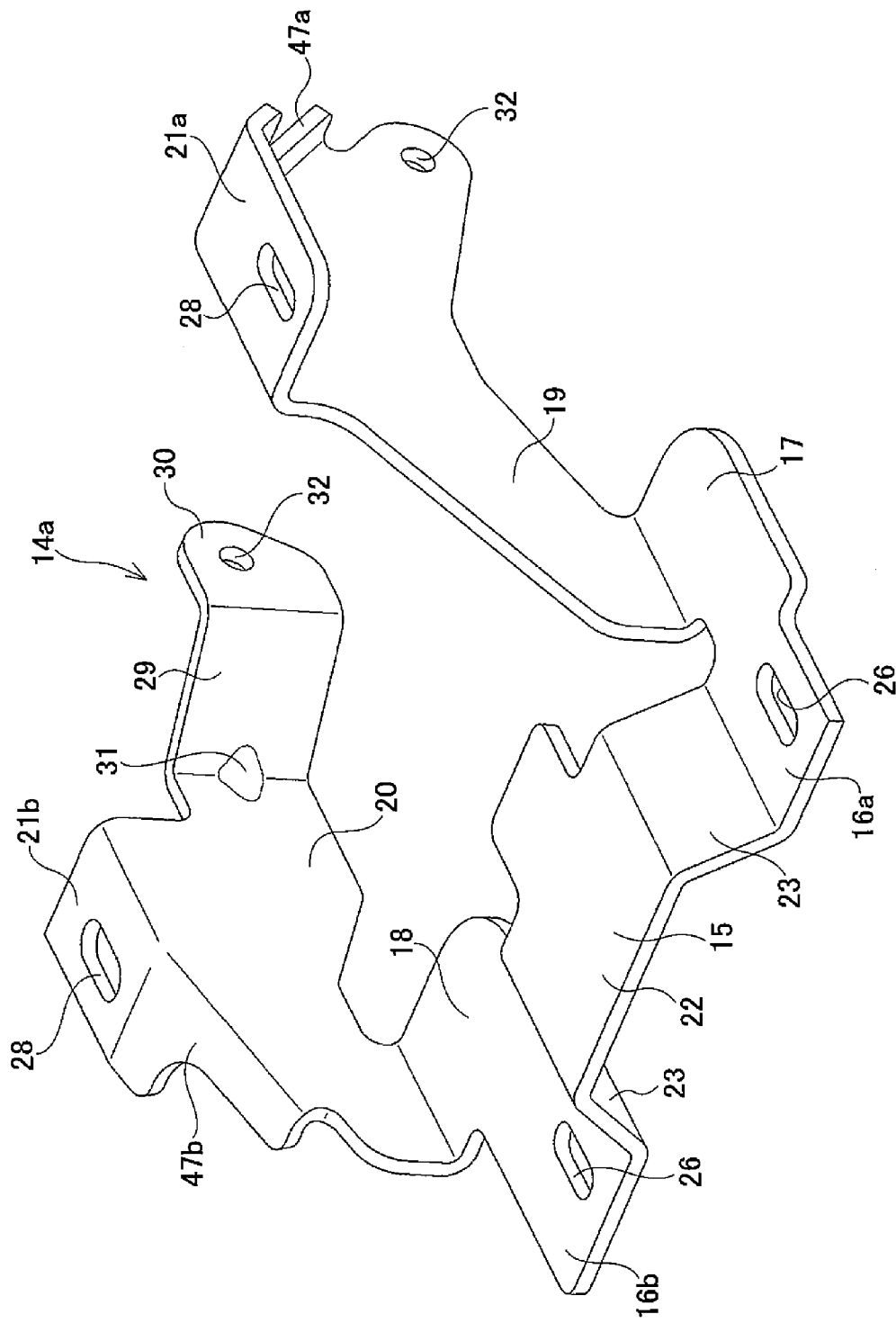
FIG. 1 is a perspective drawing illustrating a support bracket that is assembled in a first example of an embodiment of the present invention, and is a view as seen diagonally from above in the rear.
Figure 2:
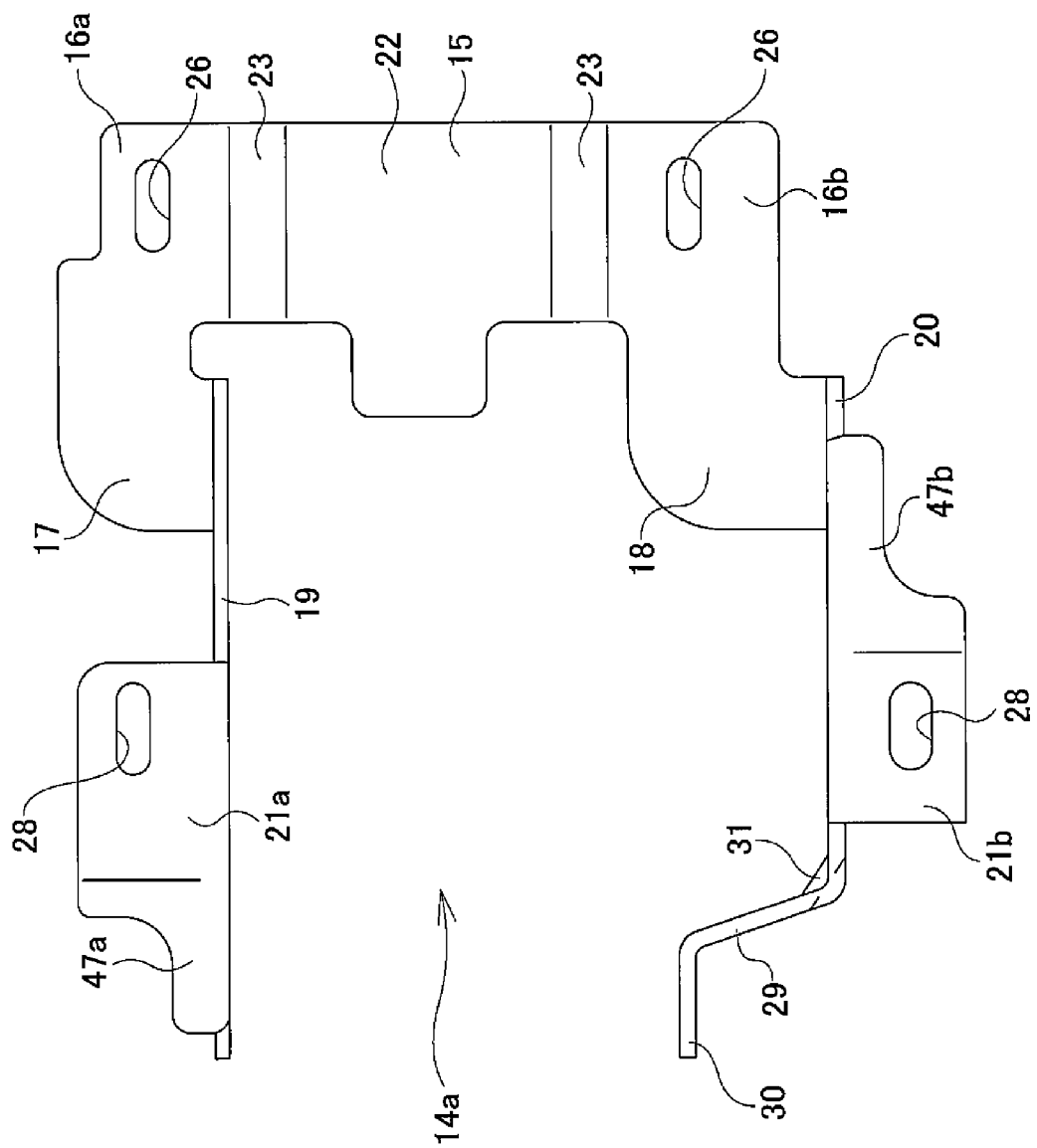
FIG. 2 is a perspective drawing illustrating the support bracket illustrated in FIG. 1, and is a view as seen from the opposite side in the width direction of that in FIG. 1.
Figure 3:
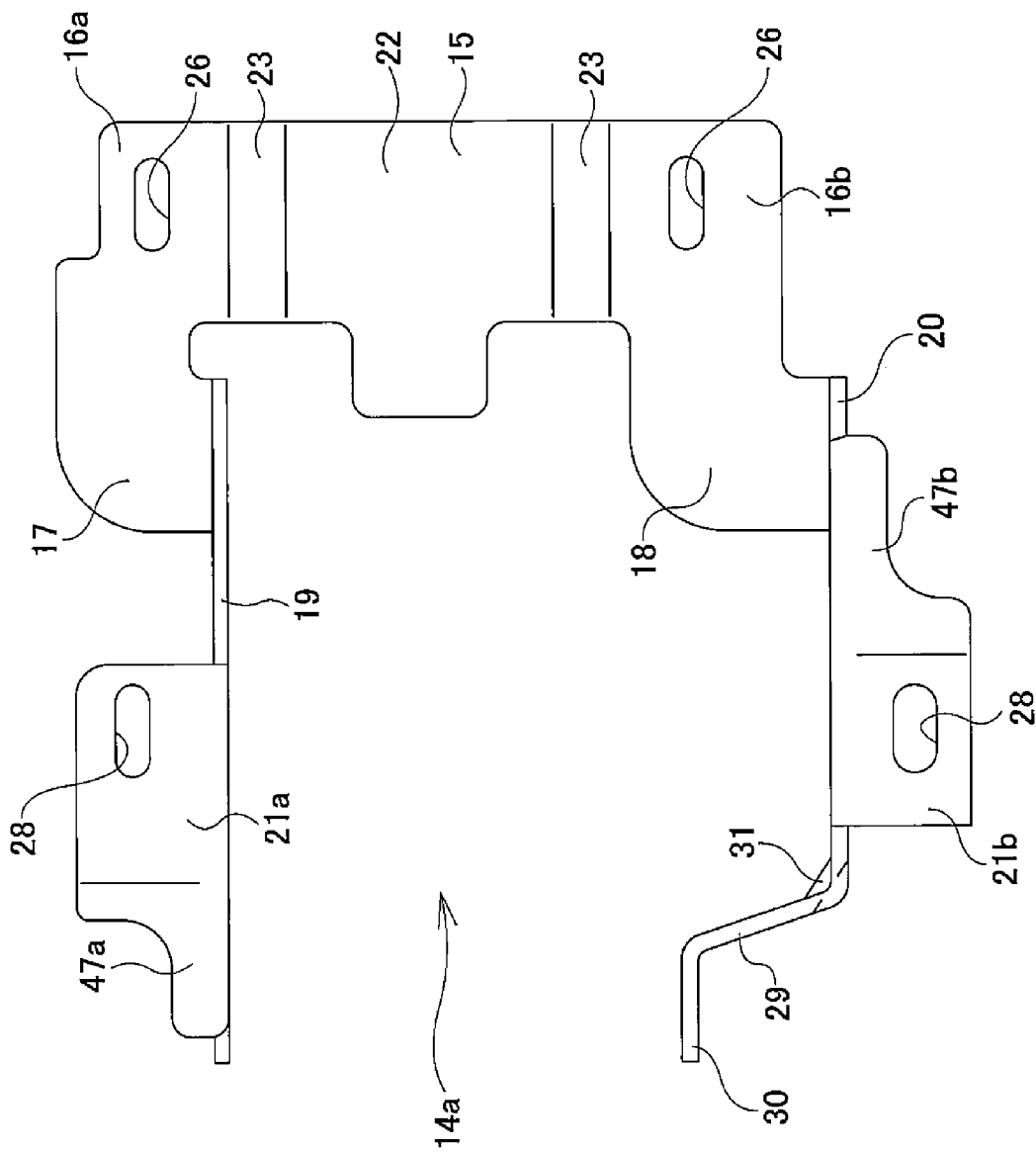
FIG. 3 is a top view of the support bracket illustrated in FIG. 1.

FIG. 1 to FIG. 13 illustrate an example of an embodiment of the present invention. Including this example, a feature of the present invention is the structure of a support bracket 14a for supporting a steering column 6a together with a housing 9a that supports components of an electric power-steering apparatus by a vehicle body 11 (see FIG. 14), and the manufacturing method thereof. The other basic structure of the electric power-steering apparatus is the same as in a conventional apparatus.

The support bracket 14a is made by using a press to perform punching and bending of a metal plate such as steel plate or stainless steel plate for which it is possible to maintain sufficient strength and rigidity, and forming the bracket into a single piece with a left and right asymmetrical shape. The thickness of the metal plate is appropriately selected by comprehensively determining the strength, rigidity and ease of processing according to the material used, for example, the thickness is about 2.0 mm to 4.0 mm in the case of using a stainless steel plate such as SUS 304. This kind of support bracket 14a comprises a base plate section 15, a pair of left and right rear installation plate sections 16a, 16b, a first extended section 17, a second extended section 18, a first side plate section 19, a second side plate section 20 and a pair of left and right front installation plate section 21a, 21b.

Of these, the base plate section 15 is provided on the rear end section of the support bracket 14a in the width direction, and comprises a flat plate section 22 in the center in the width direction, and a pair of left and right inclined plate sections 23 that are continuous outward in the width direction from the edges of the ends on both sides in the width direction of the flat plate section 22 and incline downward in a direction going away from the flat plate section 22, with the overall shape of the base plate section 15 being mountain shaped. The portions continuous from the edges on the outside ends in the width direction of these inclined plate sections 23 are the first rear installation plate section 16a and the second rear installation plate section 16b.

The inclined plate sections 23 are bent upward and continue at an angle from the edges on the inside ends in the width direction of these rear installation plate sections 16a, 16b, so the bending rigidity of the rear installation plate sections 16a, 16b is sufficiently maintained. These rear installation plate sections 16a, 16b and the flat plate section 22 are parallel with each other. These rear installation plate sections 16a, 16b are for supporting and fastening the support bracket 14a to the vehicle body 11, and are for supporting the column support bracket 24 (see FIG. 8 to FIG. 10) so as to be able to break away in the forward direction with respect to the support bracket 14a during a secondary collision. Having this kind of function, a pair of through holes 26 through which bolts 25 (see FIG. 14) or studs are passed, are formed in the rear installation plate sections 16a, 16b. These through holes 26 are long holes that are long in the forward-backward direction so as to make the work of installing the support bracket 14a to the vehicle body 11 easy and do not necessarily need high processing precision. As described above, the bending rigidity of the rear installation plate sections 16a, 16b is sufficiently high, so by using these rear installation plate section, it is possible to increase both the support rigidity of the support bracket 14a with respect to the vehicle body 11, and the support rigidity of the column support bracket 24 with respect to this support bracket 14a. In addition, the first extended section 17 and the second extended section 18 extend toward the front from the edges on the front ends of the first rear installation plate section 16a and the second rear installation plate section 16b respectively. The base end sections (back end sections) of the first side plate section 19 and the second side plate section 20 are bent upward at right angles from the side edges (the left side edges in the width direction in this example) of the first extended section 17 and the second extended section 18, and the middle sections and the tip ends sections (front end sections) thereof extend even further in the forward direction than the edges on the front ends of the first extended section 17 and the second extended section 18.

Figure 4:
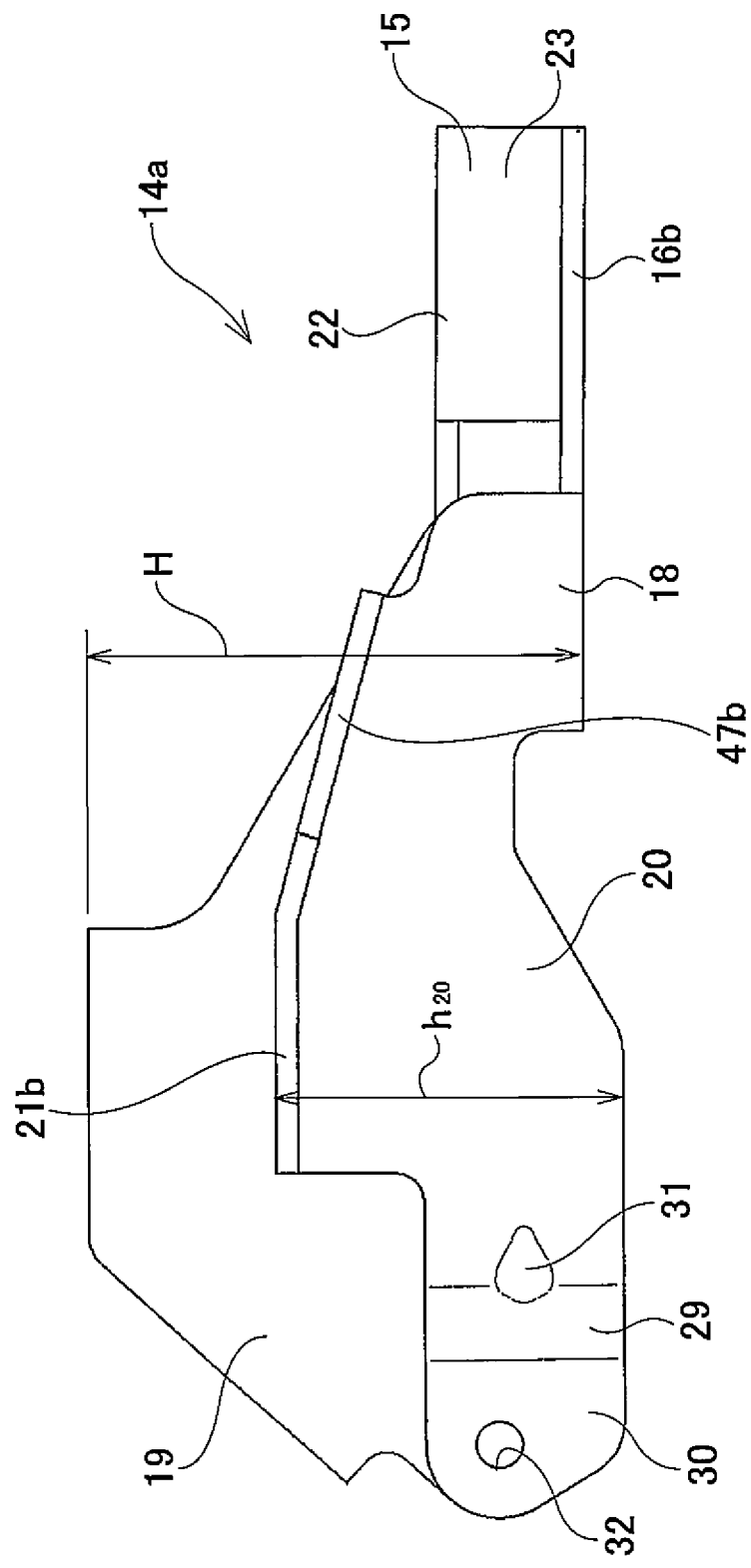
FIG. 4 is a left side view of the support bracket illustrated in FIG. 1.
Figure 5:
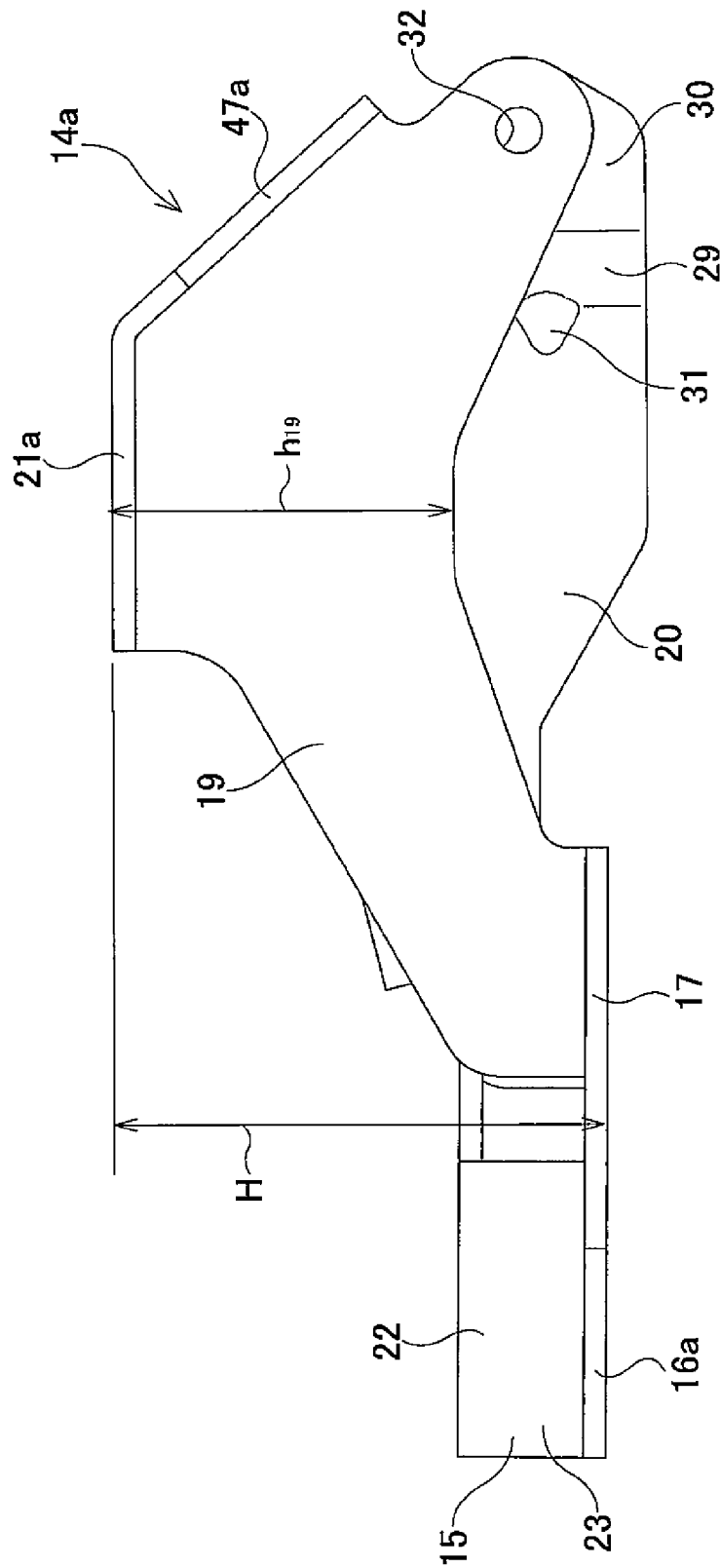
FIG. 5 is a right side view of the support bracket illustrated in FIG. 1.
Figure 6:
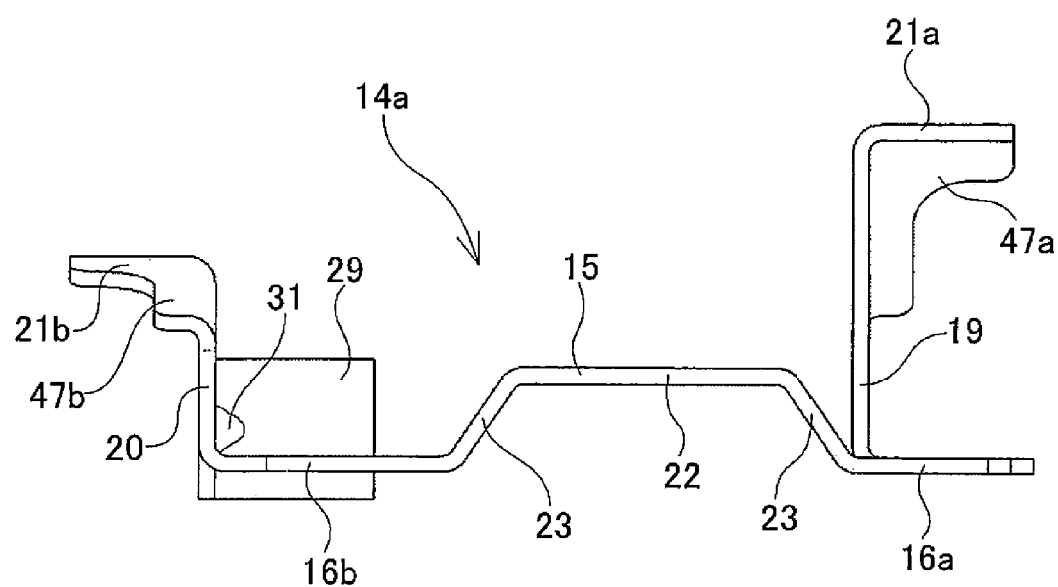
FIG. 6 is rear view of the support bracket illustrated in FIG. 1, and illustrates the stat as seen from the right in FIG. 4.

With reference to the width direction (left-right direction) of the support bracket 14a, the first side plate section 19 and the second side plate section 20 bend upward from the side edges of the same sides of the first extended section 17 and the second extended section 18 (in opposite directions with respect to inward and outward direction, and in this example, on the left side in the width direction). In other words, the base end section of the first side plate section 19 is bent upward at a right angle from the edge on the inside in the width direction of the first extended section 17. On the other hand, the second side plate section 20 is bent upward at a right angle from the edge on the outside in the width direction of the second extended section 18. By sufficiently maintaining the height dimension in the up-down direction of the first side plate section 19 and the second side plate section 20, the strength and rigidity in the up-down direction of the support bracket 14a is sufficiently maintained. More specifically, as illustrated in FIG. 4 and FIG. 5, with respect to the dimension in the up-down direction of the support bracket 14a, when the distance between an imaginary flat plane on the bottom side that includes the bottom surface of the rear installation plate sections 16a, 16b, and an imaginary flat plane on the top side that includes the top surface of the front installation plate section 21a of the front installation plate sections 21a, 21b that is located on the upper side corresponds to the height dimension H of the support bracket 14a, preferably the ratio of the height dimensions $h_{19}$, $h_{20}$ of the portions of the first side plate section 19 and the second side plate section 20 that include the front installation plate sections 21a, 21b to the height dimension H of the support bracket 14a is ⅔ or greater ($h_{19} \geq 2H/3$, $h_{20} \geq 2H/3$). However, depending on the arrangement of the surrounding parts, this ratio can be arbitrarily set within a range where the strength and rigidity of the support bracket 14a can be maintained.

Moreover, the edges on the top end of the first side plate section 19 and the second side plate section 20 are bent outward in the width direction of the support bracket 14a at right angles in the opposite directions from each other to form the first front installation plate section 21a and the second front installation plate section 21b. These front installation plate sections 21a, 21b are for supporting and fastening the support bracket 14a to the vehicle body 11, and through holes 28 though which boles or studs (not illustrated in the figure) are passed are formed in each. These through holes 28 as well are long holes that are long in the forward-backward direction so as to make the work of installing the support bracket 14a to the vehicle body 11 easy and do not necessarily need high processing precision. Moreover, a first reinforcement plate section 47a that extends downward toward the front from the edge on the front end of the first front installation plate section 21a, and a second reinforcement plate section 47b that extends downward toward the rear from the edge on the rear end of the second front installation plate section 21b are formed. The edge on the rear end of the first reinforcement plate section 47a is continuous by way of a bent section with the edge on the front end of the first installation plate section 21a, and the edge on the inside end in the width direction is continuous by way of a bent section with the edge on the top end of the first side plate section 19 respectively. The edge on the front end of the second reinforcement plate section 47b is continuous by way of a bent section with the edge on the rear end of the second front installation plate section 21b, and the edge on the inside end in the width direction is continuous by way of a bent section with the edge on the top end of the second side plate section 20 respectively. Therefore, it is possible to sufficiently increase the strength and rigidity, and particularly the bending rigidity, of the front installation plate sections 21a, 21b with respect to the first side plate section 19 and second side plate section 20.

Furthermore, in this example, the tip end section (front end section) of the second side plate section 20 is offset inward in the width direction. In other words, the middle section of the second side plate section 20 is bent inward in the width direction less than 90° and preferably between 60° and 80° to form an inclined plate section 29, and the tip end section of this inclined plate section 29 is bent toward the front at the same angle (so as to become parallel with the rear section of the second side plate section 20) to form a tip end plate section 30. A reinforcement rib 31 that protrudes inward in the bending direction is formed in the middle section in the up-down direction of the continuous section between the rear section of the second side plate section 20 and the inclined plate section 29, and this maintains the bending rigidity of this inclined plate section 29. In this example, by offsetting the tip end section of the second side plate section 20 inward in the width direction in this way, the space between the tip end section of this second side plate section 20 and the tip end section of the first side plate section 19 becomes more narrow than the space between the area from the center sections to the rear sections of these side plate sections 20, 19. In other words, the space between the tip end section of these side plate section 20, 19 is kept just at the size necessary for a pivot shaft 12a (see FIG. 8, FIG. 9 and FIG. 11), which supports the front end section of the steering column 6a (see FIG. 8 to FIG. 10, and FIG. 12) so as to be able to span, and the space between the center sections and the rear sections of the side plate sections 19, 20 is maintained at an amount such that the components of the electric power-steering apparatus can be placed. Moreover, circular holes 32 for supporting both end sections of the pivot shaft 12a are formed in the tip end sections of the first side plate section 19 and the second side plate section 20 so as to be concentric with each other.

Figure 7:
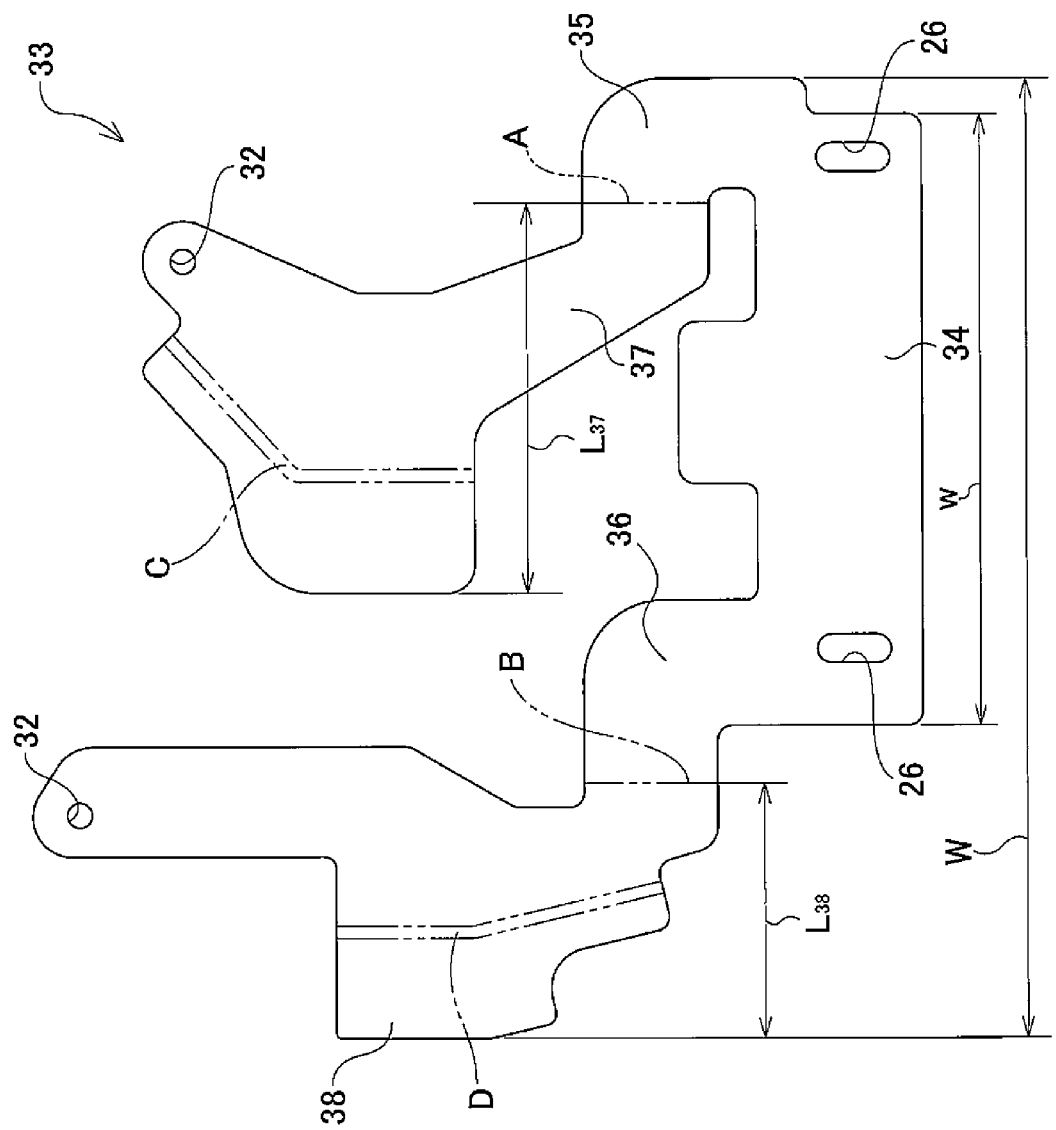
FIG. 7 is a top view illustrating a first step for manufacturing the support bracket illustrated in FIG. 1, and illustrates the intermediate material that is obtained by stamping out it from a metal plate.
Figure 8:
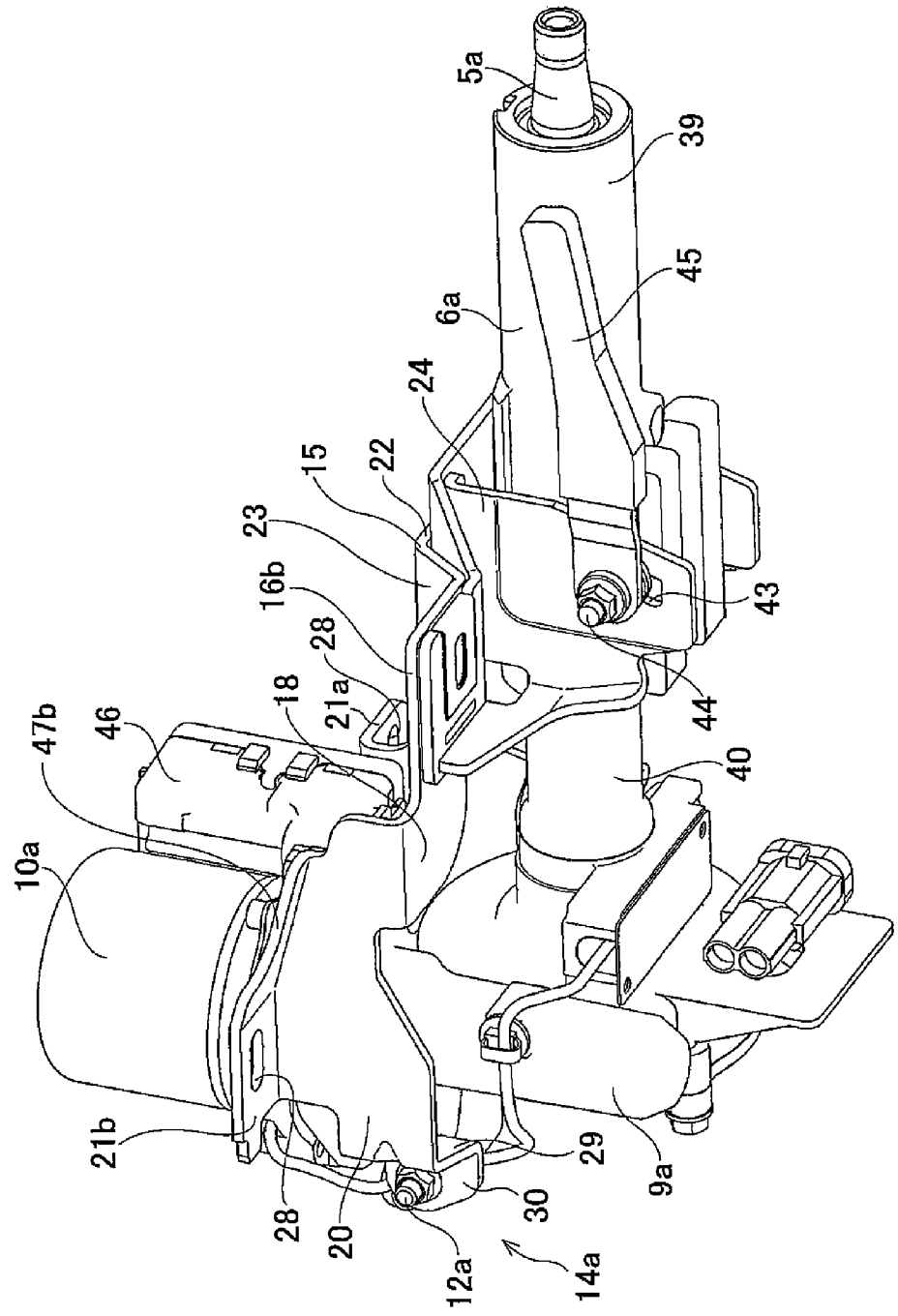
FIG. 8 is a perspective drawing illustrating an electric power-steering apparatus in which the support bracket illustrated in FIG. 1 is assembled, and is a view as seen diagonally from underneath of the left rear.
Figure 9:
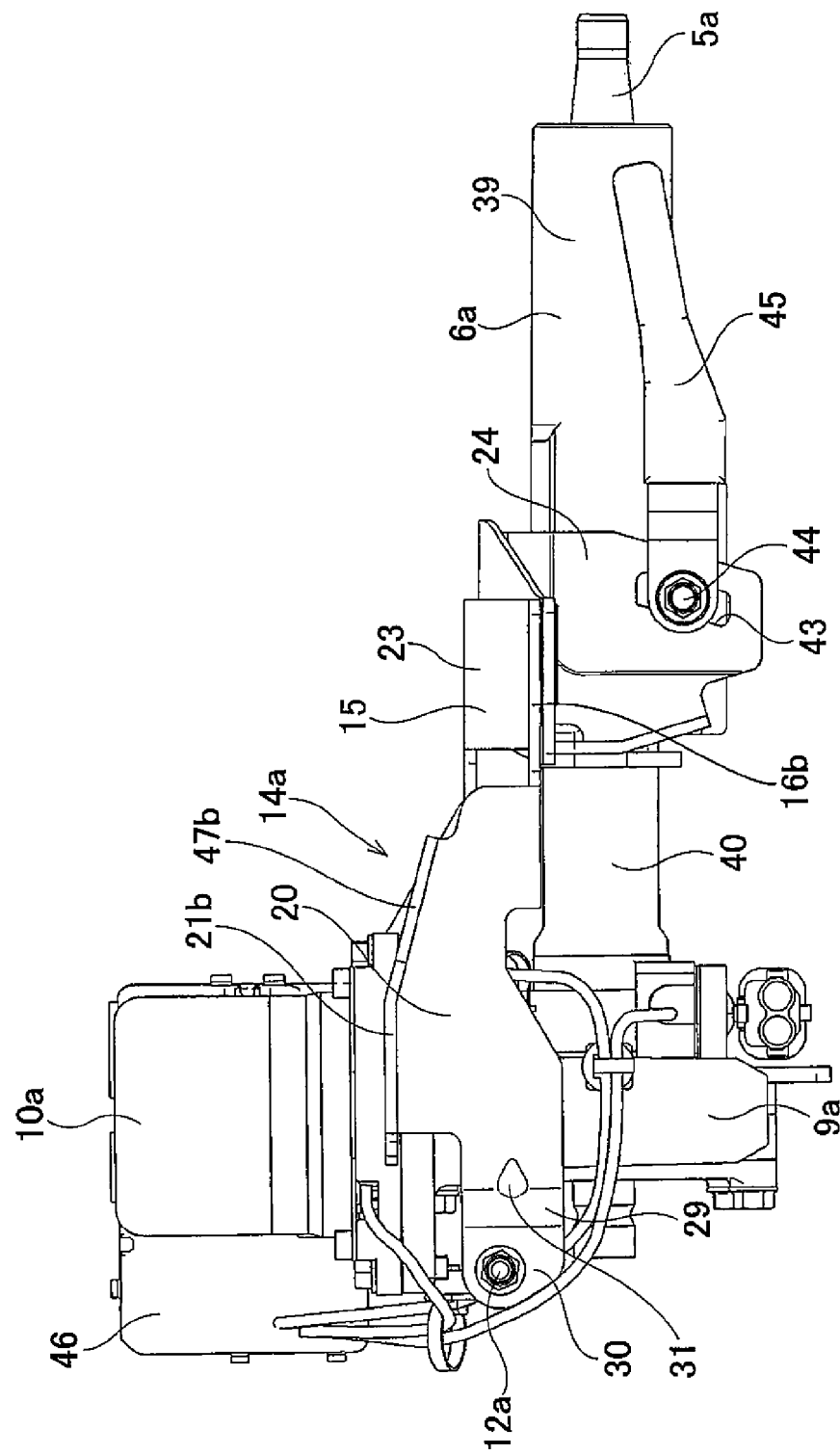
FIG. 9 is a left side view of the electric power-steering apparatus illustrated in FIG. 8.

This kind of support bracket 14a is manufactured by sequentially performing the following first process and second process for using a press to punch and bend a raw metal sheet material. In the first process, punching is performed on a flat raw material such as steel plate or stainless steel plate that has been pulled from an uncoiler to form an intermediate material 33 as illustrated in FIG. 7. This intermediate material 33 is in a complete flat plate shape, and comprises a raw base plate section 34, a first raw extended section 35 and a second raw extended section 36, and a first raw side plate section 37 and a second raw side plate section 38.

The raw base plate section 34 is the portion that will become the base plate section 15 and the rear installation plate sections 16a, 16b, and exists over the width direction in the rear end portion of the intermediate material 33 that corresponds to the base plate section 15. In this example, the through holes 26 in both end sections in the width direction of the raw base plate section 34 are formed by punching at the same time as the intermediate material 33.

In addition, the first raw extended section 35 and the second raw extended section 36 extend toward the front from the edges on the front ends of the end sections on both the left and right sides of the raw base plate section 34. The shapes of these raw extended sections 35, 36 are the same as the shapes of the first extended section 17 and second extended section 18 of the completed support bracket 14a respectively.

Moreover, the base end section of the first raw side plate section 37 extends from the edge on the inside in the width direction of the first raw extended section 35 to the center side in the width direction, and the area from the middle section to the tip end section (front end section) extends forward further than this first raw extended section 35.

Furthermore, the base end section of the second raw side plate section 38 extends from the edge on the outside in the width direction of the second raw extended section 36 to the outside in the width direction, and the area from the middle section to the tip end section (front end section) extends forward further than the second raw extended section 36.

Additionally, circular holes 32 are formed in the tip end sections of the first raw side plate section 37 and the section raw side plate section 38 by punching at the same time as the intermediate material 33. However, the through holes 28 are not formed when punching and forming the intermediate material 33, and are formed in the second process described next after the front installation plate sections 21a, 21b and the reinforcement plate sections 47a, 47b are formed, and are formed in these front installation plate sections 21a, 21b.

After the intermediate material 33 has been formed in the first process, next, in the second process, the raw base plate section 34 is bent at four locations in the width direction to form a mountain shaped base plate section 15. The portions indicated by the chain lines A to D in FIG. 7 are bent at right angles in a specified direction respectively, and the through holes 28 are punched out to form the support bracket 14a.

The process for forming the raw base plate section 34 into the base plate section 15 is a simple bending process, and the bending directions can be easily understood by comparing FIG. 7 and FIG. 1 to FIG. 6. Moreover, the process for punching out the through holes 28 is performed after the front installation plate sections 21a, 21b are formed, which prevents the shape of the through holes 28 from becoming distorted as the work for forming the front installation plate sections 21a, 21b is performed. The processing method for these through holes 28 can also be easily understood. Furthermore, the tip end half of the second raw side plate section 38 is bent, and again, by comparing FIG. 7 and FIG. 1 to FIG. 6 it is possible to easily know the processing direction for forming the inclined plate section 29, tip end plate section 30, and reinforcement rib 31. Therefore, a detailed explanation of the processing method for these parts is omitted.

Next, the method for forming the first side plate section 19, the second side plate 20, the first front installation section 21a, the second front installation section, the first reinforcement section 47a and the second reinforcement section 47b will be explained. In order to form the first side plate section 19 and the second side plate section 20, the portions indicated by the chain lines A and B the first raw side plate section 37 and the second raw side plate section 38 are bent from the first raw extended plate section 35 and second raw extended plate section 36 at right angles in the same direction to the front side in FIG. 7, or in other words, in the thickness direction of the intermediate material 33. As a result, the first side plate section 19 and the second side plate section 20 are formed so as to be parallel to each other. Moreover, the end sections in the width direction of the first raw side plate section 37 and the second raw side plate section 38 (first side plate section 19 and second side plate section 20) in the bent state are bent in opposite directions from each other to the outside in the width direction of the intermediate material 33. In other words, the end section in the width direction of the first raw side plate section 37 is bent at a right angle at the portion indicated by the chain line C in FIG. 7 toward the front side in FIG. 7 to form the first front installation plate section 21a and the first reinforcement plate section 47a. Then, the end section in the width direction of the second raw side plate section 38 is bent at a right angle at the portion indicated by the chain line D in FIG. 7 toward the rear side in FIG. 7 to form the second front installation plate section 21b and the second reinforcement plate section 47b. After that, the through holes 28 are formed in these front installation plate sections 21a, 21b respectively to complete the support bracket 24. The order of the process of bending at the portions indicated by the chain lines A and B, and the process of bending at the portions indicated by the chain lines C and D does not matter. In this example, the distance $L_{37}$ in the width direction of the intermediate material 33 from the bent section between the base end section of the first raw side plate section 37 and the first raw extended section 35 (chain line A in FIG. 7) to the edge on the inside in the width direction of the first raw side plate section 37 (edge on the left side in FIG. 7) is greater than the distance $L_{38}$ from the bent section between the base end section of the second raw side plate section 38 and the second raw extended section 36 (chain line B in FIG. 7) to the edge on the outside in the width direction of the second raw side plate section 38 (edge on the left side in FIG. 7) ($L_{37} > L_{38}$). The width dimension W of the raw base plate section 34 is sufficiently larger than the distance $L_{37}$ of the first raw side plate section 37 ($W >> L_{37}$), so even when this kind of blanking is performed, there is no interference between the raw side plate sections 37 and 38.

Moreover, by keeping the overall width dimension W of the intermediate material 33 small, it is possible to improve the blanking characteristics, or in other words it is possible to reduce the scrapped portions and thus improve the yield of the material.

In this example, the base end section of the first raw side plate section 37 is extended from the edge on of the inside in the width direction of the first raw extended section 35 to the center side in the width side, and the base end section of the second raw side plate section 38 extends from the edge on the outside in the width direction of the second raw extended section 36 to the outside in the width direction. In other words, the first raw side plate section 37 and the second raw side plate section 38 extend in the same direction, and the first raw side plate section 37 that has a particularly large width dimension is formed in the middle section in the width direction of the first raw extended section 35 and second raw extended section 36 (center section of the intermediate material 33). In this way, the good blanking characteristics of the metal plate that will become the raw material is maintained.

Figure 12:
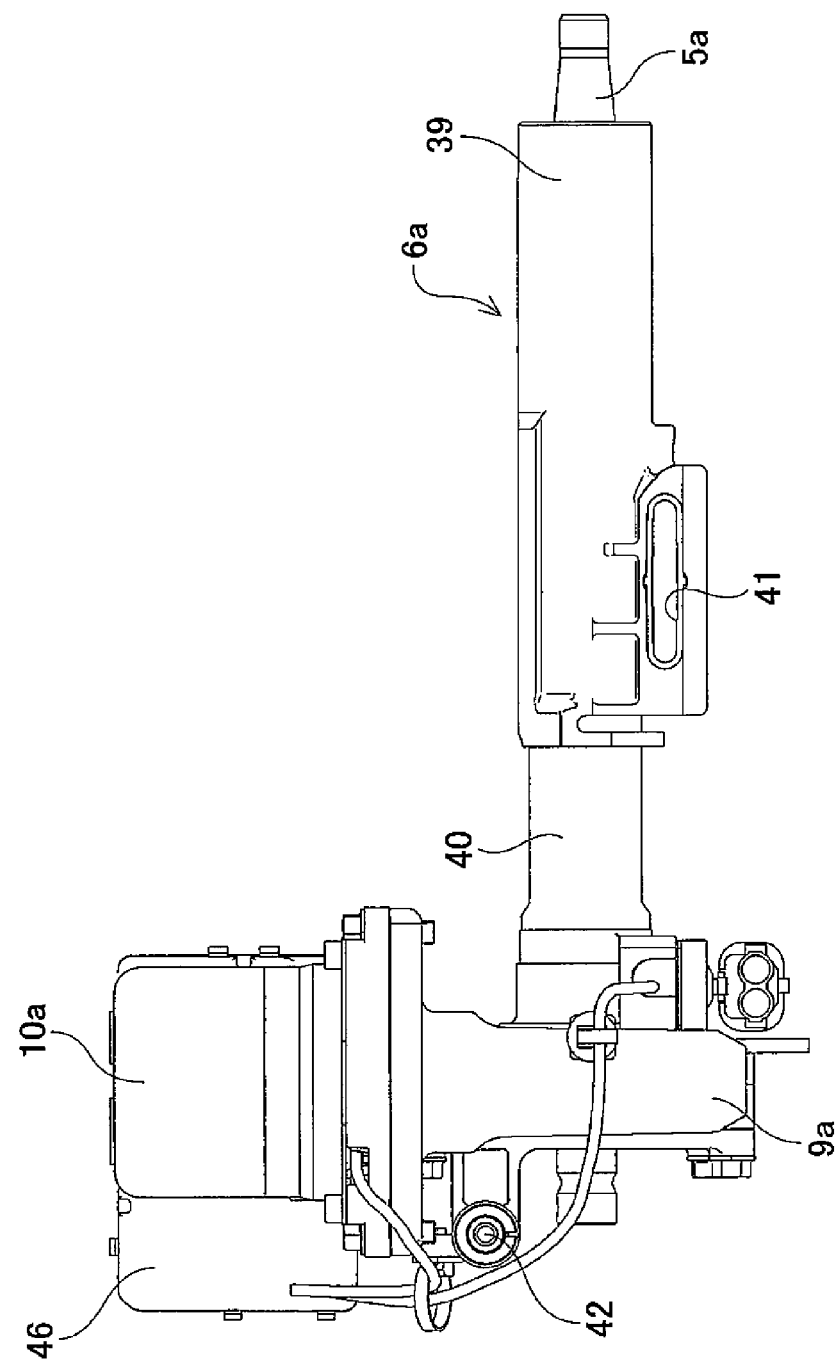
FIG. 12 is a left side view illustrating an electric power-steering apparatus before the support bracket illustrated in FIG. 1 is assembled.

The support bracket 14a having the shape as described above and manufactured as mentioned before supports the front end section of a steering column 6a such as illustrated in FIG. 12 so as to be able to pivotally displace as illustrated in FIG. 8 to FIG. 11. This steering column 6a is such that the front end section of an outer column 39 on the rear side is fitted and combined with the rear end section of an inner column 40 on the front side so as to be able to displace in the axial direction, and so the overall length can extend or contract. The inner diameter of the outer column 39 near the front end is able to elastically expand and contract, and a long hole 41 in the forward-backward direction that is long in the axial direction is formed in the outer column 39. Moreover, the steering column 6a is such that a housing 9a for housing a reduction gear of an electric power-steering apparatus is connected and fastened to the front end section of the inner column 40. A cylindrical member 42 though which a pivot shaft 12a is to be inserted is supported by and fastened to the housing 9a.

Figure 14:
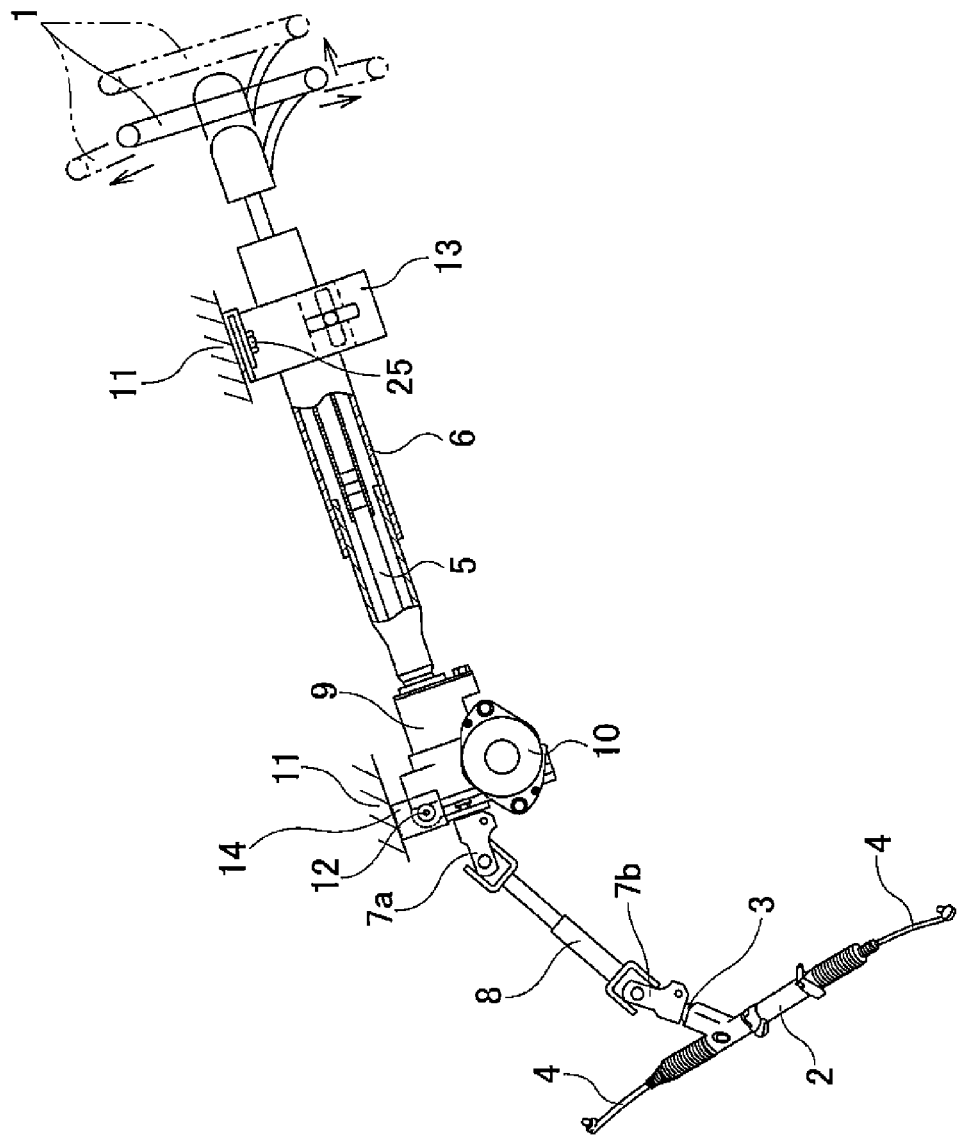
FIG. 14 is a partial cross-sectional side view illustrating an example of a conventional electric power-steering apparatus.

In order for the vehicle body to support the steering column 6a by way of the support bracket 14a, a column support bracket 24 is supported by the bottom side of the rear installation plate sections 16a, 16b so as to be able to break away in the forward direction due to an impact load that is applied during a secondary collision, and the rear installation plate sections 16a, 16b and the front installation plate sections 21a, 21b are supported by and fastened to the vehicle body 11 (see FIG. 14). Moreover, both end sections of the pivot shaft 12a that is inserted through the cylindrical member 42 are supported in the circular holes 32 that are formed in the front end sections of the first side plate section 19 and the second side plate section 20. As a result, the front end section of the steering column 6a is supported by the support bracket 14a by way of the housing 9a so as to be able to pivotally displace around the center of the pivot shaft 12a. Furthermore, the outer column 39 is supported by the column support bracket 24 by an adjustment rod 44 that is inserted through long holes 43 in the up-down direction that are formed in the column support bracket 24 and the long holes in the forward-backward direction 41. The up-down position and forward-backward position of the outer column 39 with respect to the column support bracket 24, as well as the up-down position and the forward-backward position of the steering wheel 1 (see FIG. 14) that is supported by and fastened to the rear end section of the steering shaft 5a can be adjusted within a range in which the adjustment rod 44 can displace inside the long holes 43 in the up-down direction and the long holes 41 in the forward-backward direction. Allowing or not allowing this adjustment can be switched by operating an adjustment lever 45 that is provided on the end section of the adjustment rod 44. Various structures for this kind of adjustment mechanism are widely known, and is unrelated to the feature of the present invention, so a detailed explanation is omitted here.

Figure 13:
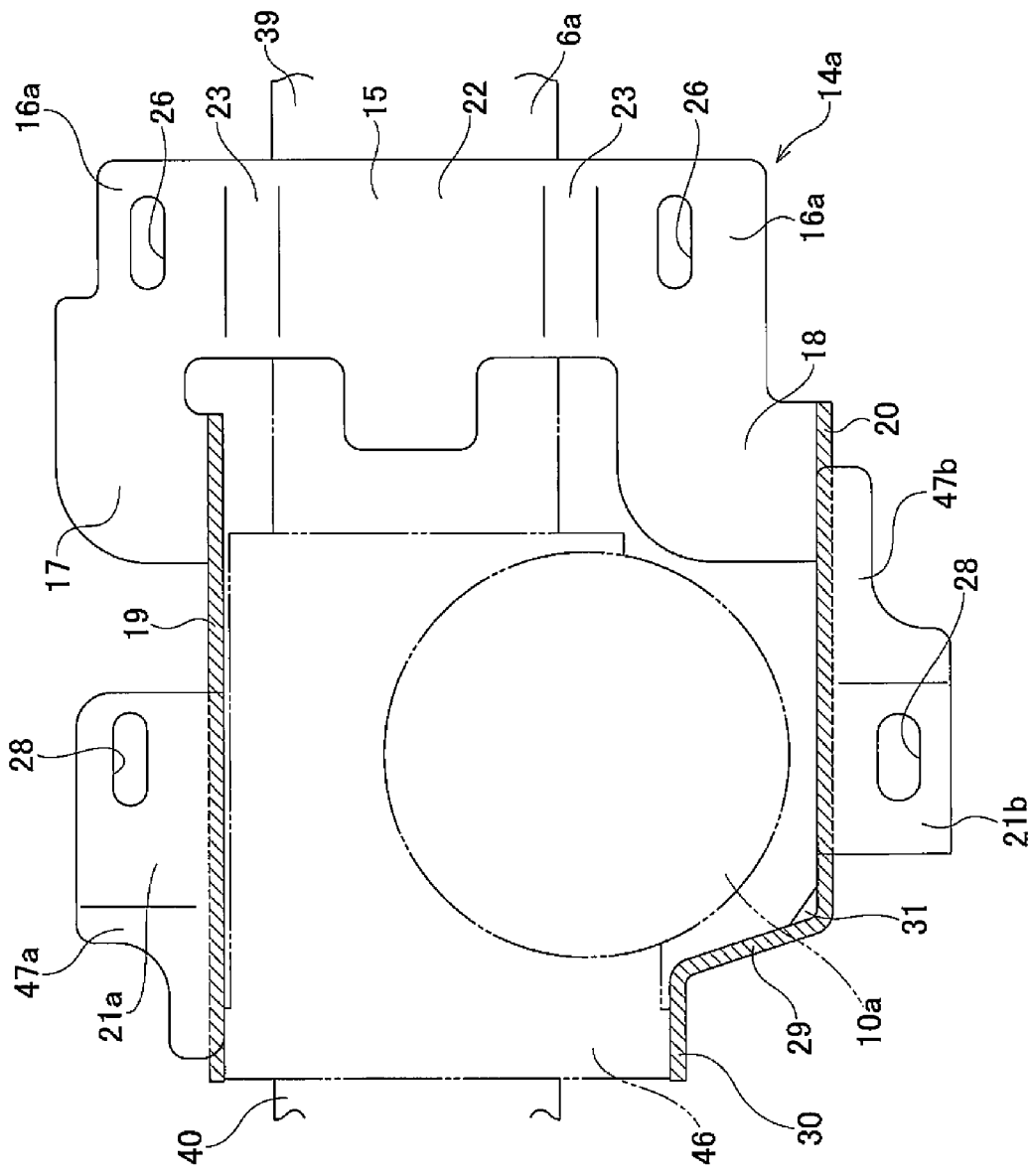
FIG. 13 is a top view for explaining the positional relationship of the component members of the electric power-steering apparatus and the support bracket that supports the front end section of the steering column, and is a view as seen from the same direction as in FIG. 3.

As described above, with the front end section of the steering column 6a supported by the support bracket 14a, components of an electric power-steering apparatus, in other words, heavy object such as the housing 9a that houses a reduction gear and the like, an electric motor 10a that is mounted around the housing 9a, a controller 46 and the like are arranged between the first side plate section 19 and the second side plate section 20 with regard to the width direction of the support bracket 14a as illustrated in FIG. 13. The height dimensions $h_{19}$, $h_{20}$ of these side plate sections 19, 20 are sufficiently maintained, so strength and rigidity of the side plate sections 19, 20 for supporting the heavy objects are sufficiently large. Therefore, it is possible for the front end section of the steering column 6a to be supported by the vehicle body by way of the support bracket 14a with sufficient rigidity maintained, and so there is no occurrence of unpleasant vibration or noise in the support section of the steering column 6a due to vibration that is applied while the vehicle is traveling. In the case of the structure illustrated in FIG. 10, the electric motor 10a is such that the direction of the center axis is in an orthogonal direction to the center axis of the steering column 6a, and the electric motor 10a is located above the steering column 6a. However, the installation direction of the electric motor 10a could be inclined with respect to the center axis of the steering column 6a, and the electric motor 10a could be located lateral to or below the steering column 6a.

Furthermore, the support bracket 14a, as described above, is such that the blanking characteristics of the metal plate that will become the raw material are devised; and the support bracket 14a is manufactured as a single piece by performing punching and bending of the metal plate in a state where the amount of wasted material is kept to a minimum, so it is possible to keep manufacturing costs of the support bracket 14a low.

Figure 10:
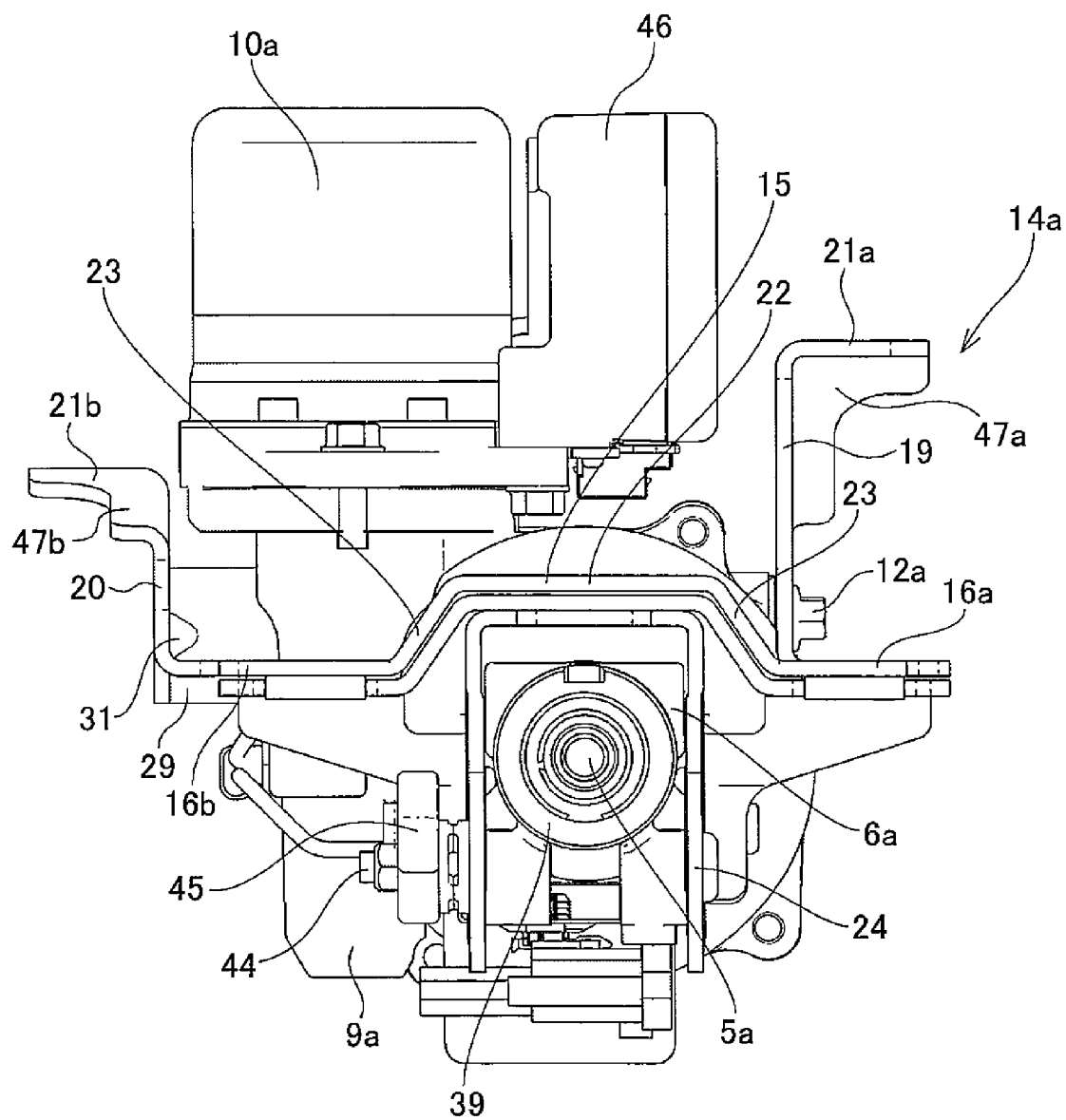
FIG. 10 is a rear view of the electric power-steering apparatus illustrated in FIG. 8 as seen from the right in FIG. 9.
Figure 11:
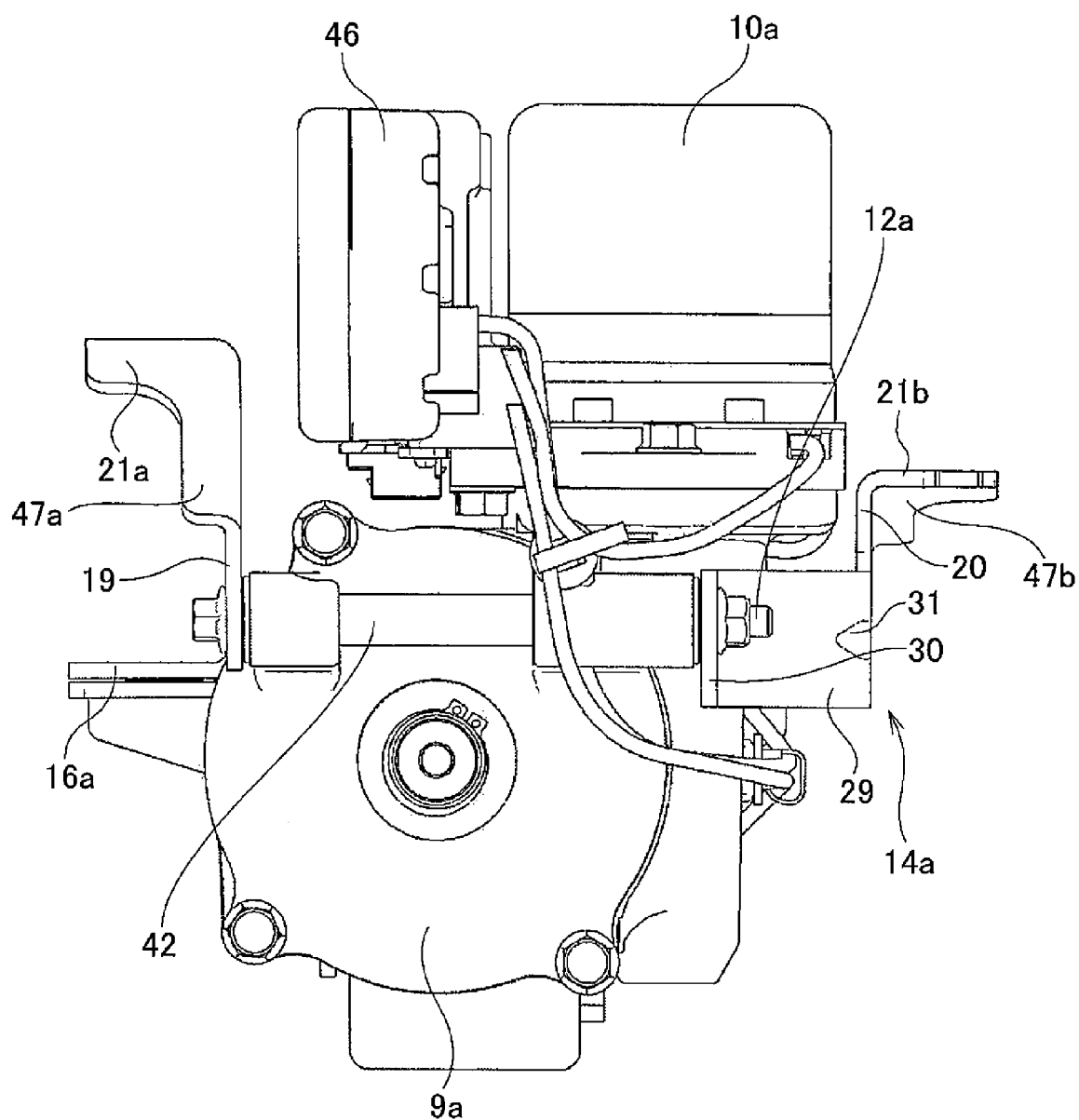
FIG. 11 is a front view of the electric power-steering apparatus illustrated in FIG. 8 as seen from the left in FIG. 9.

Particularly, in the structure of this example, the components of an electric power-steering apparatus are placed at a position offset further to the side of the second side plate section 20 than the center position of the portion between the side plate sections 19 and 20 (nearer the left in FIG. 10, and nearer the right in FIG. 13). To correspond with this, the position of the second front installation plate section 21b that is formed on the edge section of the top end of the second side plate section 20 is also offset with respect to the center position in the width direction of the support bracket 14a. That is, in this example, the installation position of the components of the electric power-steering apparatus that includes the electric motor 10a is offset, and by devising the position of the component parts of the support bracket 14a to correspond with this, it is possible to improve the blanking characteristics and to sufficiently reduce the cost of the support bracket 14a.

INDUSTRIAL APPLICABILITY

The example in the figures illustrates a structure in which the present invention is applied to an electric power-steering apparatus in which not only a tilt mechanism for adjusting the up-down position of the steering wheel is assembled, but also a telescoping mechanism for adjusting the forward-backward position is assembled. However, a premise of the present invention is the structure for supporting the front end section of the steering column by a support bracket, so when embodying the present invention, it is possible to omit the telescopic mechanism, or to even further, omit the tilt mechanism.

EXPLANATION OF THE REFERENCE NUMBERS

1 Steering wheel
2 Steering gear unit
3 Input shaft
4 Tie rod
5, 5a Steering shaft
6, 6a Steering column
7a, 7b Universal joint
8 Intermediate shaft
9, 9a Housing
10, 10a Electric motor
11 Vehicle body
12, 12a Pivot shaft
13 Rear support bracket
14, 14a Support bracket
15 Base plate section
16a First rear installation plate section
16b Second rear installation plate section
17 First extended section
18 Second extended section
19 First side plate section
20 Second side plate section
21a First front installation plate section
21b Second front installation plate section
22 Flat plate section
23 Inclined plate section
24 Column support bracket
25 Bolt
26 Through hole
28 Through hole
29 Inclined plate section
30 Tip end plate section
31 Reinforcement rib
32 Circular hole
33 Intermediate material
34 Raw base plate section
35 First raw extended section
36 Second raw extended section
37 First raw side plate section
38 Second raw side plate section
39 Outer column
40 Inner column
41 Long hole in the forward-backward direction
42 Cylindrical member
43 Long hole in the up-down direction
44 Adjustment rod
45 Adjustment lever
46 Controller
47a First reinforcement plate section
47b Second reinforcement plate section

What is claimed is:
1. A support bracket for supporting a steering column made by punching and bending a metal plate into a single piece having a left and right asymmetrical shape, and comprising:
   a base plate section provided in a width direction on a rear end section of the support bracket and having end sections in the direction;
   a pair of left and right rear installation plate sections provided on the end sections in the width direction of the base plate section;

a first extended section and a second extended section respectively extending forward from an edge on a front end of each of the left and right rear installation plate sections;

a first side plate section provided in a state of being bent upward from an edge on an inside in the width direction of the first extended section;

a second side plate section provided in a state of being bent upward from an edge on an outside in the width direction of the second extended section;

a first front installation plate section provided in a state of being bent outward in the width direction from an edge on a top end of the first side plate section;

a second front installation plate section provided in a state of being bent outward in the width direction from an edge on a top end of the second side plate section;

a first reinforcement plate section extending downward and forward from an edge on a front end of the first front installation plate section, and having an edge on a rear end that is continuous to the edge on the front end of the first front installation section by way of a bent section, and an edge on an end in the width direction that is continuous to the edge on the top end of the first side plate section by way of a bent section; and a second reinforcement plate section extending downward and backward from an edge on a rear end of the second front installation plate section, and having an edge on a front end that is continuous to the edge on the rear end of the second front installation plate section by way of a bent section, and an edge on an end in the width direction that is continuous to the edge on the top end of the second side plate section by way of a bent section.

2. The support bracket according to claim 1, wherein circular holes for supporting a pivot shaft for supporting the steering column are formed in a front end section of the first side plate section and a front end section of the second side plate section.

3. A support bracket for supporting a steering column made by punching and bending a metal plate into a single piece having a left and right asymmetrical shape, and comprising:

a base plate section provided in a width direction on a rear end section of the support bracket and having end sections in the width direction;

a pair of left and right rear installation plate sections provided on the end sections in the width direction of the base plate section;

a first extended section and a second extended section respectively extending forward from and edge on a front end of each of the left and right rear installation plate sections;

a first side plate section provided in a state of being bent upward from an edge on an inside in the width direction of the first extended section;

a second side plate section provided in a state of being bent upward from an edge on an outside in the width direction of the second extended section;

a first front installation plate section provided in a state of being bent outward in the width direction from an edge on a top end of the first side plate section; and a second front installation plate section provided in a state of being bent outward in the width direction from an edge on a top end of the second side plate section, wherein the front end section of the second side plate section is offset inward in the width direction, and a space between the front end sections of the first side plate section and the second side plate section is more narrow than a space between middle sections and rear sections of the first side plate section and the second side plate section.

4. The support bracket according to claim 3, wherein the front end section of the second side plate section is continuous with the middle section in a forward-backward direction of the second side plate section by way of an inclined plate section, and a reinforcement rib is provided in a middle section in an up-down direction of a bent section where the middle section of the second side plate section and the inclined plate section are continuous, the reinforcement rib protruding inward in a bending direction of the bent section.

5. A method for manufacturing a support bracket for supporting a steering column made by punching and bending a metal plate into a single piece having a left and right asymmetrical shape, wherein the support bracket comprises:

a base plate section provided in a width direction on a rear end section of the support bracket and having end sections in the width direction;

a pair of left and right rear installation plate sections provided on the end sections in the width direction of the base plate section;

a first extended section and a second extended section respectively extending forward from an edge on a front end of each of the left and right rear installation plate sections;

a first side plate section provided in a state of being bent upward from an edge on an inside in the width direction of the first extended section;

a second side plate section provided in a state of being bent upward from an edge on an outside in the width direction of the second extended section;

a first front installation plate section provided in a state of being bent outward in the width direction from an edge on a top end of the first side plate section; and a second front installation plate section provided in a state of being bent outward in the width direction from an edge on a top end of the second side plate section, the manufacturing method comprising the steps of:

forming an intermediate material that has an overall flat shape by stamping out the intermediate material from a raw material that has a flat shape, the intermediate material comprising: a raw base plate section that exists in a portion that corresponds to the base plate section; a first raw extended section and a second raw extended section that respectively extend forward from edges on a front end of end sections on left and right sides of the raw base plate section; a first raw side plate section that extends from an edge on an inside in the width direction of the first raw extended section to a center side in the width direction; and a second raw side plate section that extends from an edge on an outside in the width direction of the second raw extended section to the outside in the width direction; and bending a base end section of the first raw side plate section with respect to the first raw extended section, and bending a base end section of the second raw side plate section with respect to the second raw extended section in a same direction in a thickness direction of the intermediate material to form the first side plate section and the second side plate section, and bending end sections in the width direction of the first side plate section and second side plate section to an outside in the width direction of the intermediate material in opposite directions from each other to form the first front installation plate section and the second installation plate section.

6. The manufacturing method for a support bracket according to claim 5, wherein, with reference to the width direction of the intermediate material, a distance from a bent section between the base end section of the first raw side plate section and the first raw extended section to an edge on an inside in the width direction of the first raw side plate section is greater than a distance from a bent section between the base end section of the second raw side plate section and the second raw extended section to an edge on an outside in the width direction of the second raw side plate section.

7. An electric power-steering apparatus, comprising:
a steering column;
a housing connected to a front end section of the steering column and in which or on which components of the electric power-steering apparatus are mounted; and
a support bracket supporting and fastening the front end section of the steering column to a vehicle body by way of the housing,
wherein
the support bracket, which is made by punching and bending a metal plate into a single piece having a left and right asymmetrical shape, comprises:
a base plate section provided in a width direction on a rear end section of the support bracket and having end sections in the width direction;
a pair of left and right rear installation plate sections provided on the end sections in the width direction of the base plate section;
a first extended section and a second extended section respectively extending forward from an edge on a front end of each of the left and right rear installation plate sections;
a first side plate section provided in a state of being bent upward from an edge on an inside in the width direction of the first extended section;
a second side plate section provided in a state of being bent upward from an edge on an outside in the width direction of the second extended section;
a first front installation plate section provided in a state of being bent outward in the width direction from an edge on a top end of the first side plate section; and
a second front installation plate section provided in a state of being bent outward in the width direction from an edge on a top end of the second side plate section, and
wherein
the front end section of the second side plate section is offset inward in the width direction, and a space between the front end sections of the first side plate section and the second side plate section is more narrow than a space between middle sections and rear sections of the first side plate section and the second side plate section, and the component parts are arranged between the middle sections and the rear sections of the first side plate section and the second side plate section.

8. The electric power-steering apparatus according to claim 7, wherein
the front end section of the steering column is supported by a pivot shaft that spans between the front end sections of the first side plate section and second side plate section to pivotally move with respect to a vehicle body.

9. The electric power-steering apparatus according to claim 7, wherein
the component parts are located at a position offset more toward a side of the second side plate section than a center position in the width direction of a space between the first side plate section and the second side plate section.

* * * * *